(12) United States Patent
Wong et al.

(10) Patent No.: US 11,792,358 B2
(45) Date of Patent: Oct. 17, 2023

(54) VIDEO TRANSMITTING CIRCUIT AND SIGNAL DELAY COMPENSATION METHOD THEREOF

(71) Applicant: ALi Corporation, Hsinchu (TW)

(72) Inventors: Fong-Shen Wong, Taipei (TW); Jian-Shiang Fang, Taipei (TW); Chih-Yuan Hsu, Taipei (TW)

(73) Assignee: ALI CORPORATION, Hsinchu (TW)

( * ) Notice: Subject to any disclaimer, the term of this patent is extended or adjusted under 35 U.S.C. 154(b) by 271 days.

(21) Appl. No.: 17/389,763

(22) Filed: Jul. 30, 2021

(65) Prior Publication Data

US 2022/0046204 A1 Feb. 10, 2022

(30) Foreign Application Priority Data

Aug. 7, 2020 (CN) .......................... 202010792701.9

(51) Int. Cl.
*H04N 5/94* (2006.01)
*H04N 9/77* (2006.01)
*H04N 5/926* (2006.01)

(52) U.S. Cl.
CPC ............. *H04N 5/94* (2013.01); *H04N 5/9268* (2013.01); *H04N 9/77* (2013.01)

(58) Field of Classification Search
CPC .. H04N 5/94; H04N 9/77; H04N 5/38; H04N 5/44

(Continued)

(56) References Cited

U.S. PATENT DOCUMENTS

| 7,782,314 B2 * | 8/2010 | Niiyama | H04N 11/06 345/520 |
| 8,184,723 B2 * | 5/2012 | DiSanto | G09G 5/006 375/259 |

(Continued)

FOREIGN PATENT DOCUMENTS

| CN | 1985521 A | 6/2007 |
| CN | 101682792 A | 3/2010 |

(Continued)

OTHER PUBLICATIONS

Zhou Tianhong, "High-Frequency Electronic Circuit Experimental Design Experience and Techniques.", Automation and Instrumentation, vol. 03, May 25, 2013 (May 25, 2013), p. 177, p. 180.

*Primary Examiner* — Helen Shibru
(74) *Attorney, Agent, or Firm* — Li & Cai Intellectual Property (USA) Office

(57) ABSTRACT

A video transmitting circuit and a signal delay compensation method thereof are provided. The video transmitting circuit transmits a specific signal through a first transmission path and a second transmission path to a video receiver during a calibration mode. In the calibration mode, a return detection circuit of the video transmitting circuit detects whether or not a first return signal transmitted through the first transmission path and a second return signal transmitted through the second transmission path have been received by the video transmitting circuit. The video transmitting circuit sets delay circuits serially connected in the first or second transmission path according to a detection result of the return detection circuit, such that the first return signal transmitted through the first transmission path and the second return signal transmitted through the second transmission path can synchronously arrive at the video receiver.

14 Claims, 8 Drawing Sheets

(58) Field of Classification Search
USPC .......................................................... 386/271
See application file for complete search history.

(56) References Cited

U.S. PATENT DOCUMENTS

| | | | | |
|---|---|---|---|---|
| 8,634,028 | B2* | 1/2014 | Hall | H04N 9/72 |
| | | | | 348/694 |
| 2006/0116030 | A1* | 6/2006 | Niiyama | H04B 3/466 |
| | | | | 439/894 |
| 2009/0219980 | A1* | 9/2009 | DiSanto | H04B 3/466 |
| | | | | 375/259 |
| 2012/0014460 | A1* | 1/2012 | Aziz | H04L 25/03885 |
| | | | | 375/257 |
| 2012/0287345 | A1* | 11/2012 | Lien | H04N 7/108 |
| | | | | 348/731 |
| 2016/0336930 | A1 | 11/2016 | Matsuno et al. | |
| 2018/0205359 | A1 | 7/2018 | Wang | |

FOREIGN PATENT DOCUMENTS

| | | |
|---|---|---|
| CN | 101953157 A | 1/2011 |
| CN | 102780552 A | 11/2012 |
| CN | 204905447 U | 12/2015 |
| CN | 103248856 B | 3/2016 |
| CN | 109729581 A | 5/2019 |

\* cited by examiner

VIDEO TRANSMITTING CIRCUIT AND SIGNAL DELAY COMPENSATION METHOD THEREOF

CROSS-REFERENCE TO RELATED PATENT APPLICATION

This application claims the benefit of priority to China Patent Application No. 202010792701.9, filed on Aug. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a signal delay compensation method, and more particularly to a video transmitting circuit and a signal delay compensation method thereof.

BACKGROUND OF THE DISCLOSURE

In conventional methods, a video signal may be composed of a plurality of signal components, in which each of the plurality of signal components is respectively transmitted through a transmission path. For example, a transmitter end may transmit a chrominance signal composed of a luminance signal (Y) and two chrominance signals (Pb and Pr) through three transmission paths to a chrominance component interface. However, under a situation that the transmission paths do not have an equal length, the luminance signal and the chrominance signal cannot synchronously arrive at the receiver end, so that the received video shows a phenomenon of color shift (due to delay skew) which leads to low image quality. In addition, it is known that color shift may be fixed by means of digital detection and digital compensation at the receiver end. However, the delay skew can only be converged within a limited range at the receiver end, and the abovementioned means lose effectiveness when encountering a greater delay skew.

SUMMARY OF THE DISCLOSURE

In response to the above-referenced technical inadequacies, the present disclosure provides a video transmitting circuit and a signal delay compensation method thereof.

In one aspect, the first embodiment of the present disclosure provides a video transmitting circuit configured to transmit a video signal at least composed of a first signal and a second signal, in which the first signal is transmitted through a first transmission path and the second signal is transmitted through a second transmission path to a video receiver. The video transmitting circuit includes a pre-processing circuit, a return detection circuit and a control circuit. The pre-processing circuit is configured to detect whether or not a preset pulse has been received by the video transmitting circuit, wherein the video transmitting circuit switches to a calibration mode and the pre-processing circuit transmits a specific signal to the video receiver through the first transmission path and the second transmission path when the preset pulse is received by the video transmitting circuit. The return detection circuit is configured to detect a first return signal transmitted through the first transmission path and a second return signal transmitted through the second transmission path from the video receiver to the video transmitting circuit when the video transmitting circuit is in the calibration mode, wherein the first return signal corresponds to the specific signal transmitted through the first transmission path the second return signal corresponds to the specific signal transmitted through the second transmission path. The control circuit is coupled to the return detection circuit, and configured to calculate a delay skew between the first transmission path and the second transmission path according to a detection result of the return detection circuit, and set a first delay circuit serially connected in the first transmission path or a second delay circuit serially connected in the second transmission path in the video transmitting circuit according to the delay skew, such that the first signal transmitted through the first transmission path and the second signal transmitted through the second transmission path can synchronously arrive at the video receiver.

In a preferable embodiment, the return detection circuit at least includes a first signal detection circuit and a second signal detection circuit. The first signal detection circuit is coupled to the first transmission path, and configured to start counting when the specific signal being transmitted through the first transmission path has been detected, and generate a first count until the first return signal transmitted through the first transmission path being received by the video transmitting circuit has been detected. The second signal detection circuit is coupled to the second transmission path, and configured to start counting when the specific signal being transmitted through the second transmission path has been detected, and generate a second count until the second return signal transmitted through the second transmission path being received by the video transmitting circuit has been detected; wherein the control circuit calculates the delay skew between the first transmission path and the second transmission path according to the first count and the second count.

In another aspect, the second embodiment of the present disclosure provides a video transmitting circuit configured to transmit a video signal at least composed of a first signal and a second signal, in which the first signal is transmitted through a first transmission path and the second signal is transmitted through a second transmission path to a video receiver. The video transmitting circuit includes a pre-processing circuit, a return detection circuit, and a control circuit. The pre-processing circuit is configured to detect whether or not the video transmitting circuit has received a preset pulse, wherein the video transmitting circuit switches to a calibration mode and the pre-processing circuit simultaneously transmits a specific signal to the video receiver through the first transmission path and the second transmission path when the preset pulse is received by the video transmitting circuit. The return detection circuit is configured to detect a first return signal transmitted through the first transmission path and a second return signal transmitted through the second transmission path from the video receiver to the video transmitting circuit when the video transmitting circuit is in the calibration mode, wherein the first return signal corresponds to the specific signal transmitted through the first transmission path the second return signal corresponds to the specific signal transmitted through the second transmission path. The control circuit is coupled to the return detection circuit, and configured to transmit a reset signal for resetting an input index or an output index of the first and second buffers to a first buffer serially connected in the first transmission path or a second buffer serially connected the second transmission path in the video transmitting circuit when the first return signal transmitted through the first transmission path or the second return signal transmitted through the second transmission path being received by the video transmitting circuit has been detected by the return detection circuit detect.

In a preferable embodiment, after the input indexes of the first buffer serially connected in the first transmission path and the second buffer serially connected in the second transmission path have been reset by the reset signal, the control circuit synchronously set the output indexes of the first and second buffers, such that the first signal transmitted through the first transmission path and the second signal transmitted through the second transmission path can synchronously arrive at the video receiver.

In yet another aspect, the present disclosure provides a signal delay compensation method used in a video transmitting circuit configured to transmit a video signal at least composed of a first signal and a second signal, and transmit the first signal through a first transmission path and the second signal through a second transmission path to a video receiver. The method includes detecting, by a pre-processing circuit, whether or not a preset pulse has been received by the video transmitting circuit; wherein when the preset pulse has been received by the video transmitting circuit, the method further includes switching, by the video transmitting circuit, to a calibration mode and; transmitting, by the pre-processing circuit, a specific signal to the video receiver through the first transmission path and the second transmission path; detecting, by a return detection circuit, whether or not a first return signal transmitted through the first transmission path and a second return signal transmitted through the second transmission path from the video receiver have been received by the video transmitting circuit when the video transmitting circuit is in the calibration mode, wherein the first return signal corresponds to the specific signal transmitted through the first transmission path the second return signal corresponds to the specific signal transmitted through the second transmission path; and setting, by a control circuit, a first delay circuit serially connected in the first transmission path or a second delay circuit serially connected in the second transmission path in the video transmitting circuit according to a detection result of the return detection circuit, such that the first signal and the second signal can synchronously arrive at the video receiver through the first transmission path and the second transmission path, respectively.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings, in which.

DETAILED DESCRIPTION OF THE EXEMPLARY EMBODIMENTS

Figure 1:
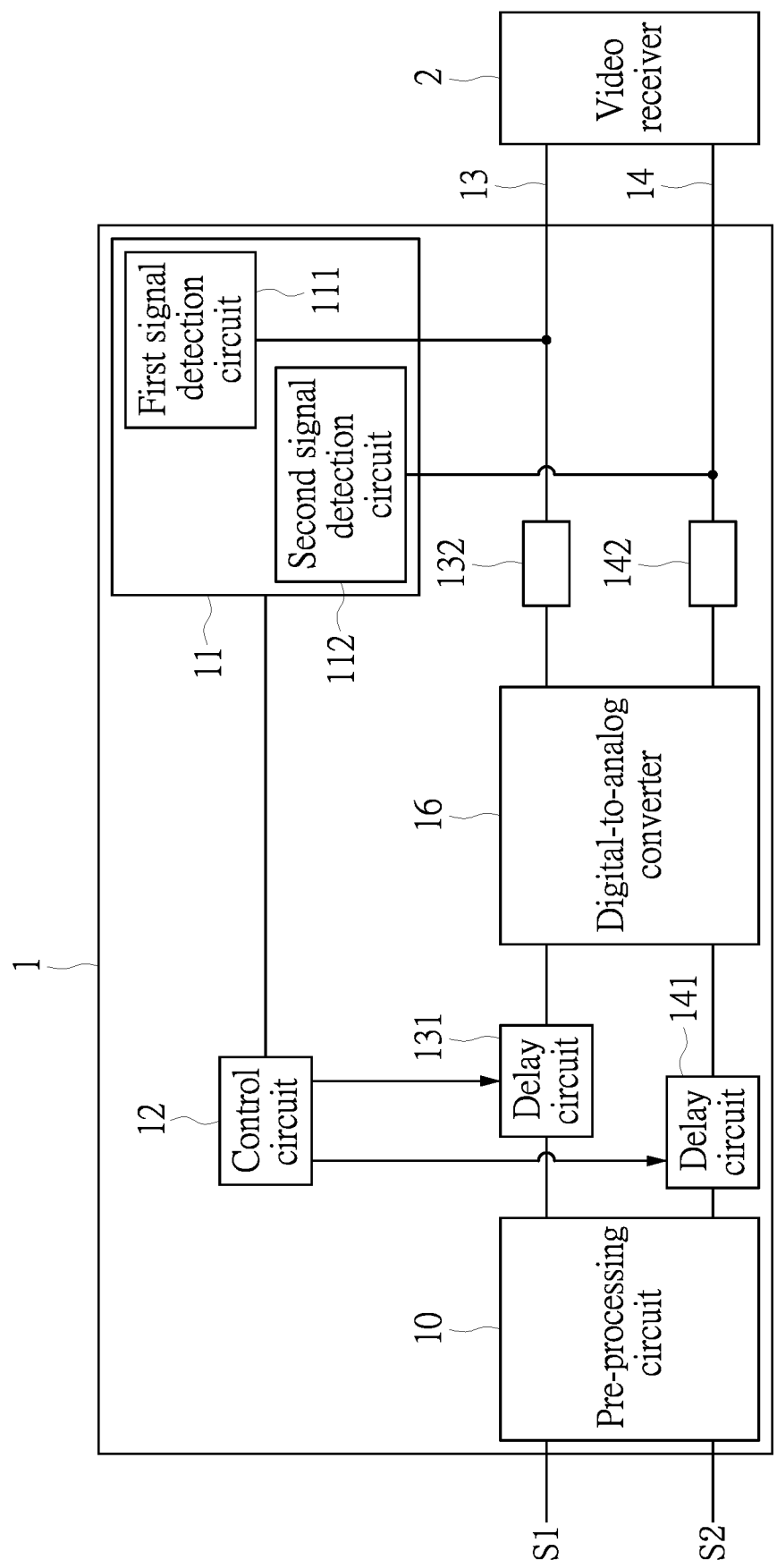
FIG. 1 is a functional block diagram of a video transmitting circuit according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

It should be noted that a video transmitting circuit of the embodiment of the present disclosure may be utilized in any transmitter end that supports composite video signal transmission. That is to say, the video transmitting circuit of the embodiment of the present disclosure transmits a video signal at least composed of a first signal and a second signal, in which the first signal is transmitted through a first transmission path and the second signal is transmitted through a second transmission path to a video receiver. Referring to FIG. 1, FIG. 1 is a functional block diagram of a video transmitting circuit 1 according to a first embodiment of the present disclosure. As shown in FIG. 1, the video transmitting circuit 1 includes a pre-processing circuit 10, a return detection circuit 11 and a control circuit 12. The pre-processing circuit 10 is configured to detect whether or not a preset pulse has been received by the video transmitting circuit 1. When the preset pulse has been received by the video transmitting circuit 1, the video transmitting circuit 1 operates in a calibration mode or switches to the calibration mode from a normal operating mode, and the pre-processing circuit 10 transmits a specific signal to the video receiver 2 through the first transmission path 13 and the second transmission path 14.

In the calibration mode, the return detection circuit 11 is configured to detect whether or not a first return signal transmitted through the first transmission path 13 and a second return signal transmitted through the second transmission path 14 have been received by the video transmitting circuit 1 from the video receiver 2. The first return signal corresponds to the specific signal transmitted through the first transmission path 13 and the second return signal corresponds to the specific signal transmitted through the second transmission path 14. The control circuit 12 is coupled to the return detection circuit 11, and configured to calculate a delay skew between the first transmission path 13 and the second transmission path 14 according to a detection result of the return detection circuit 11, and set a delay circuit 131 serially connected in the first transmission path 13 or a delay circuit 141 serially connected in the second transmission path 14 in the video transmitting circuit 1 according to the delay skew, such that a first signal S1 transmitted through the first transmission path 13 and a second signal S2 transmitted through the second transmission path 14 can synchronously arrive at the video receiver 2.

In the first embodiment, an adjustable resistor is serially connected in the first transmission path 13 and an adjustable resistor is serially connected in the second transmission path 14 in the video transmitting circuit 1. As shown in FIG. 1, an adjustable resistor 132 is serially connected in the first transmission path 13 and an adjustable resistor 142 is serially connected in the second transmission path 14 in the video transmitting circuit 1, and the adjustable resistors 132 and 142 are located close to the video receiver 2. In the normal operating mode, the video transmitting circuit 1 and the video receiver 2 must be impedance-matched by tuning resistances of the adjustable resistors 132 and 142, so that the signal energy generated by the video transmitting circuit 1 can be completely transmitted to the video receiver 2, otherwise there will be reflected (return) signal due to impedance mismatch. However, when the video transmitting circuit 1 is in the calibration mode due to a reception of the preset pulse, the video transmitting circuit 1 adjusts the resistances of the adjustable resistors 132 and 142, e.g., adjust the resistances to 0 ohms, such that the video transmitting circuit 1 can receive the first return signal and the second return signal from the video receiver 2 due to impedance mismatch after the specific signal has been transmitted. That is to say, after the video transmitting circuit 1 has switched to the calibration mode, the delay skew between the first and second transmission paths are calculated in the present disclosure according to the characteristics of signal reflection due to impedance mismatch. Therefore, in comparison with the related art, the present disclosure may fix color shift at the transmitter end, so as to improve image quality without being influenced by the receiver end.

Moreover, the preset pulse may include at least one of a blanking section of the video signal and a null signal section that is outside of a visible section of the video signal, but the present disclosure is not limited thereto. In the first embodiment, the return detection circuit 11 may include at least a first signal detection circuit 111 and at least a second signal detection circuit 112. The first signal detection circuit 111 is coupled to the first transmission path 13, and configured to start counting when the specific signal transmitted through the first transmission path 13 has been detected, and generate a first count until the first return signal that is transmitted through the first transmission path 13 being received by the video transmitting circuit 1 has been detected. On the other hand, the second signal detection circuit 112 is coupled to second transmission path 14, and configured to start counting when the specific signal transmitted through the second transmission path 14 has been detected, and generate a second count until the second return signal that is transmitted through second transmission path 14 being received by the video transmitting circuit 1 has been detected. The control circuit 12 calculates the delay skew between the first transmission path 13 and the second transmission path 14 according to the first count and the second count.

More specifically, the first embodiment takes the video transmitting circuit 1 utilized in a chrominance component interface as an example, but the present disclosure is not limited thereto. Therefore, reference is made to FIG. 2, the video transmitting circuit 1 in FIG. 2 transmits a video signal composed of a luminance signal Y, a chrominance signal Pb and a chrominance signal Pr, and transmits the luminance signal Y through the first transmission path 13, transmits the chrominance signal Pb through the second transmission path 14 and transmits the chrominance signal Pr through a third transmission path 15 to the video receiver 2. When the blanking section of the video signal has been received by the video transmitting circuit 1, the video transmitting circuit 1 switches to the calibration mode to adjust resistances of an adjustable resistor 132 serially connected in the first transmission path 13, an adjustable resistor 142 serially connected in the second transmission path 14 and an adjustable resistor 152 serially connected in the third transmission path 15 in the video transmitting circuit 1. For example, the video transmitting circuit 1 adjusts the resistances of the adjustable resistors 132, 142 and 152 to 0 ohms, and the pre-processing circuit 10 transmits the specific signal to the video receiver 2 through the first transmission path 13, the second transmission path 14 and the third transmission path 15.

It should be noted that, the present disclosure can be provided without limiting how the specific signal and the adjust resistance are realized. In general, after the specific signal has been transmitted, the video transmitting circuit 1 can receive a part of the specific signal that is reflected from the video receiver 2 due to impedance mismatch, in which the first return signal is a part of the specific signal that is transmitted through the first transmission path 13 and reflected from the video receiver 2, the second return signal is a part of the specific signal that is transmitted through the second transmission path 14 and reflected from the video receiver 2, and the third transmission path 15 is a part of the specific signal that is transmitted through the third transmission path 15 and reflected from the video receiver 2. The first signal detection circuit 111 starts counting when the specific signal transmitted through the first transmission path 13 has been detected, and generates the first count until the first return signal that is transmitted through the first transmission path 13 being received by the video transmitting circuit 1 has been detected. On the other hand, the second signal detection circuit 112 starts counting when the specific signal transmitted through the second transmission path 14 has been detected, and generates a second count until the second return signal that is transmitted through the second transmission path 14 being received by the video transmitting circuit 1 has been detected.

Moreover, the third signal detection circuit 113 starts counting when the specific signal transmitted through the third transmission path 15 has been detected, and generates a third count until the third return signal that is transmitted through the third transmission path 15 being received by the video transmitting circuit 1 has been detected. Therefore, each count refers to a round trip time when the specific signal propagates from the video transmitting circuit 1 through the corresponding transmission path and returns to the video receiver 2, and dividing each count by two refers to a propagation delay corresponding to the transmission path. Naturally, in order to allow the count to infer the exact propagation delay of the transmission path, each of the signal detection circuits may be coupled to the corresponding transmission path close to the output terminal of the video transmitting circuit 1, but the present disclosure is not limited thereto.

Given that the first count is 16 time units, the second count is 26 time units, and the third count is 32 time units, the control circuit 12 may calculate the delay skew between the first transmission path 13 and the second transmission path 14 being 5 time units, the delay skew between the first transmission path 13 and the third transmission path 15 being 8 time units, and the delay skew between the second transmission path 14 and the third transmission path 15 being 3 time units. In other words, the third transmission path 15 has the longest length, so that the chrominance signal Pr is the latest one to be transmitted through third transmission path 15 to the video receiver 2. Afterwards, the control circuit 12 may set the delay circuit 131 in the first transmission path 13 to delay the luminance signal Y by 8 time units than the chrominance signal Pr according to the delay skew between the first transmission path 13 and the third transmission path 15, and then transmit the luminance signal Y through the first transmission path 13 to the video receiver 2.

Figure 2:
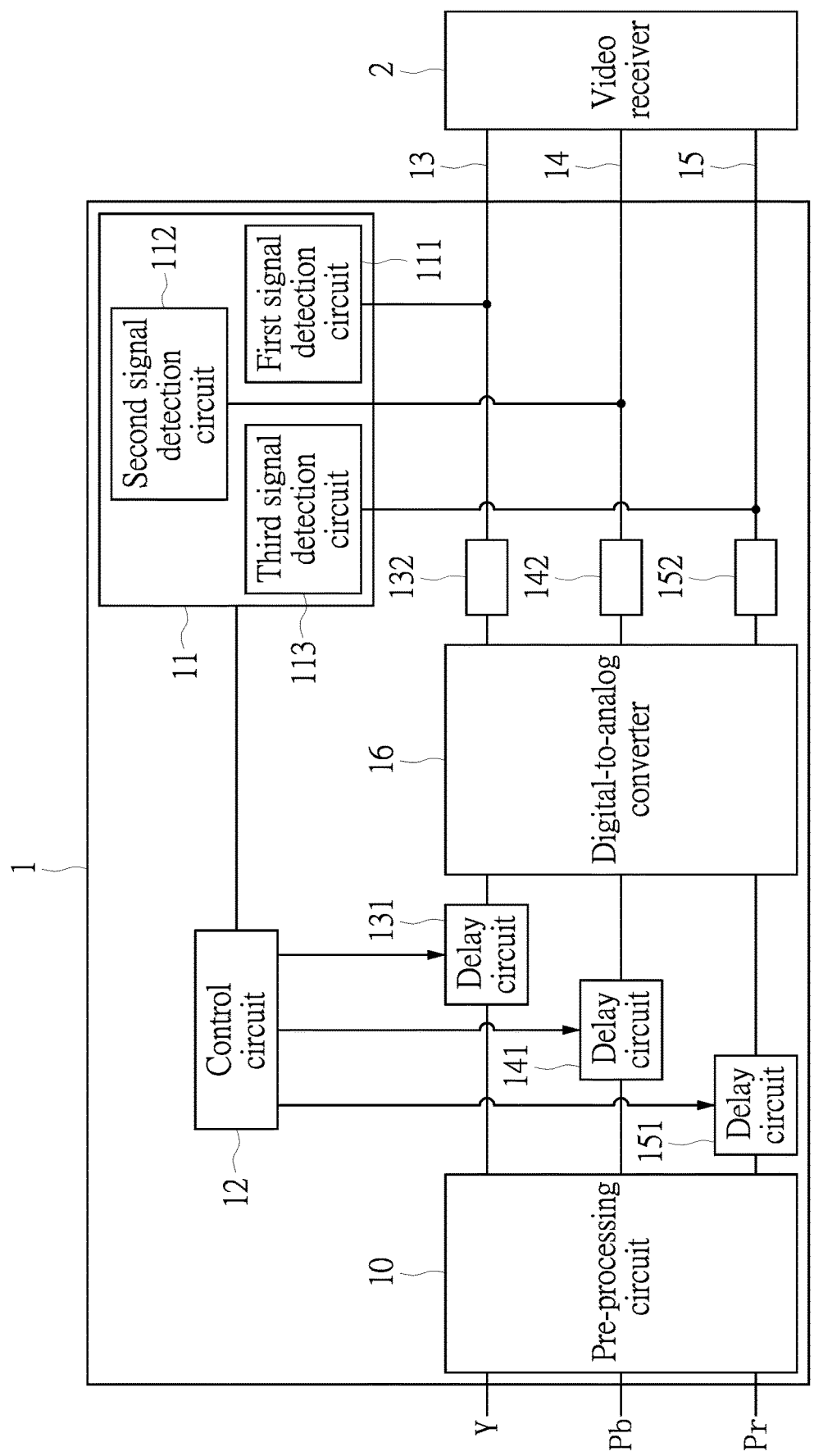
FIG. 2 is a functional block diagram of the video transmitting circuit in FIG. 1 utilized in a chrominance component interface according to the first embodiment of the present disclosure.

On the other hand, the control circuit 12 may set the delay circuit 141 in the second transmission path 14 to delay the chrominance signal Pb by 3 time units than the chrominance signal Pr according to the delay skew between the second transmission path 14 and the third transmission path 15, and then transmits the chrominance signal Pb through the second transmission path 14 to the video receiver 2. That is to say, in the present disclosure, the propagation delay between the transmission paths is not delayed, but the component signal that arrives at the video receiver 2 earlier than another component signal is delayed by the delay circuit in the corresponding transmission path. Naturally, in order to not change the propagation delay of each of the transmission paths, the delay circuit serially connected in each the transmission path may be located close to the input terminal of the video transmitting circuit 1, as shown in FIG. 1 and FIG. 2, but the present disclosure is not limited thereto.

Moreover, a digital-to-analog converter 16 may be serially connected between each of the transmission path in the video transmitting circuit 1, and the digital-to-analog converter 16 may be located between the delay circuit and the adjustable resistor that are serially connected in each of the transmission path. Therefore, compared with the related art, in the present disclosure, the video transmitting circuit 1 detects the transmitted signal at a node of each the transmission path by an analog detection, and compensates the return signal at the node of each the transmission path by a digital compensation, such that each the component signal transmitted through each the transmission path can synchronously arrives at the video receiver 2. As can be learned, after each the return signal that is transmitted through each the transmission path being received by the video transmitting circuit 1 has been detected by the return detection circuit 11, the video transmitting circuit 1 can switch from the calibration mode to the normal operating mode, and adjust each the adjustable resistor that is serially connected in each the transmission path in the video transmitting circuit 1, so that the video transmitting circuit 1 and the video receiver 2 become impedance-matched as before.

On the other hand, when the video transmitting circuit 1 receives the preset pulse again, the video transmitting circuit 1 may accordingly switch to the calibration mode, calculate the delay skew between the transmission paths according to the characteristics of signal reflection due to impedance mismatch, and set the delay circuit according to the delay skew, such that the component signals that are transmitted through different transmission paths can synchronously arrive at the video receiver 2 when the video transmitting circuit 1 switches from the calibration mode to the normal operating mode. That is to say, the video transmitting circuit 1 of the present disclosure is able to perform a signal delay compensation method during every blanking section or every null signal section of the video signal, or selectively perform the signal delay compensation method during a portion of the blanking section or a portion of the null signal section of the video signal. For example, the signal delay compensation method may be performed at least once after the video transmitting circuit 1 is turned on and before the video signal is displayed, the signal delay compensation method may be automatically and regularly performed after the video transmitting circuit 1 is turned on at every fixed time (e.g., 1 second, 1 minute, 10 minutes, etc.), or the signal delay compensation method may be performed when a control command is executed by a user, so as to improve image quality.

On the other hand, the present disclosure can be provided without limiting how the delay circuit is realized. In practice, the delay circuit may be realized by a buffer, in this situation, the pre-processing circuit 10 simultaneously transmits the specific signal through the first transmission path 13 and through the second transmission path 14 to the video receiver 2.

Second Embodiment

Figure 3:
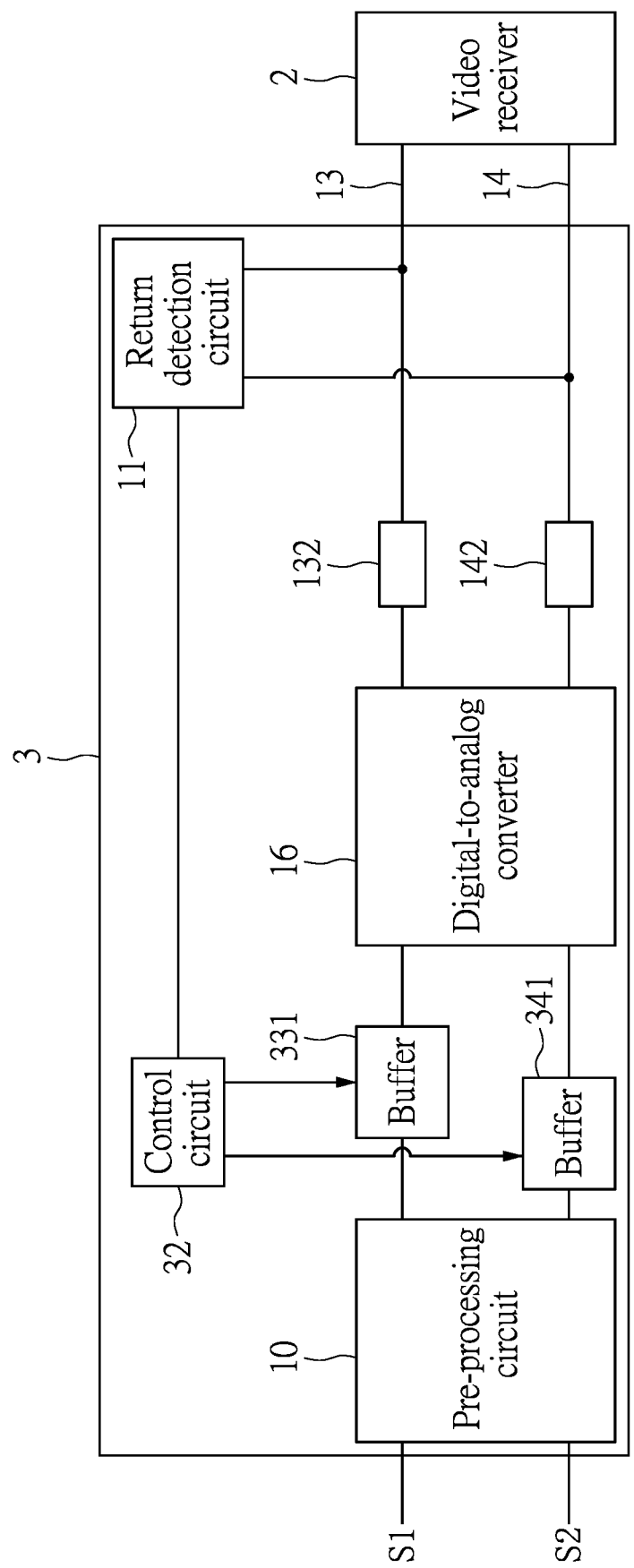
FIG. 3 is a functional block diagram of a video transmitting circuit according to a second embodiment of the present disclosure.

Referring to FIG. 3, FIG. 3 is a functional block diagram of a video transmitting circuit according to a second embodiment of the present disclosure. Elements in FIG. 3 that are similar to the elements in FIG. 1 are marked with the same symbols, and are not reiterated herein. Compared with the control circuit 12 in FIG. 1, when the first return signal that is transmitted through the first transmission path 13 or the second return signal that is transmitted through the second transmission path 14 being received by the video transmitting circuit 1 has been detected by the return detection circuit 11, a control circuit 32 in FIG. 3 sends out the reset signal to a buffer 331 serially connected in the first transmission path 13 or to a buffer 341 serially connected in the second transmission path 14 in a video transmitting circuit 3 to reset input indexes of the buffers 331 and 341; for example, reset the input indexes to 0. On the other hand, after the input indexes of the buffer 331 serially connected in the first transmission path 13 and the buffer 341 serially connected in the second transmission path 14 have been reset due to the reset signal, the control circuit 32 simultaneously sets output indexes of the buffers 331 and 341; for example, set the output indexes to 0, such that the first signal S1 transmitted through the first transmission path 13 and the second signal S2 transmitted through the second transmission path 14 can synchronously arrive at the video receiver 2.

Figure 4:
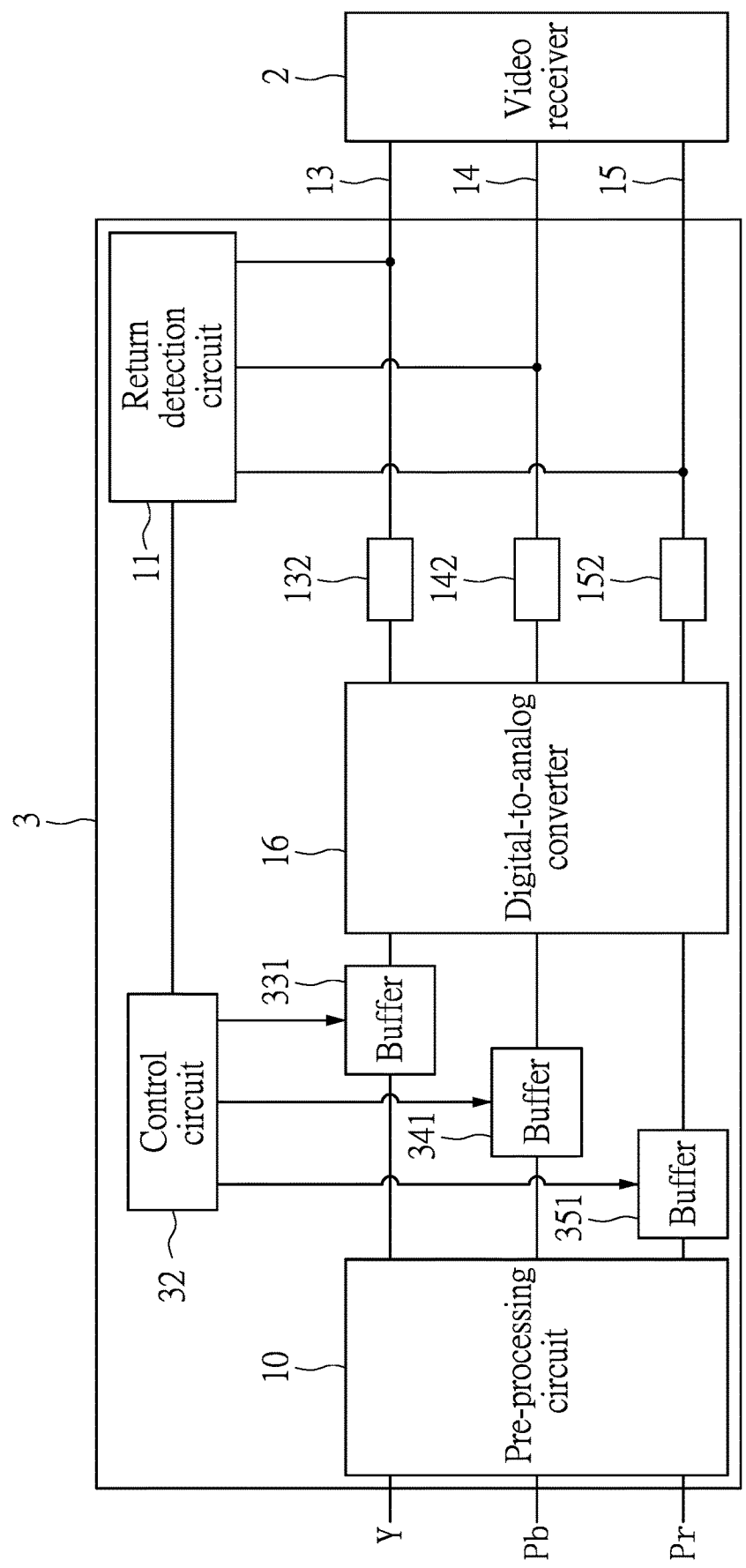
FIG. 4 is a functional block diagram of the video transmitting circuit in FIG. 3 utilized in a chrominance component interface according to the second embodiment of the present disclosure.
Figure 5:
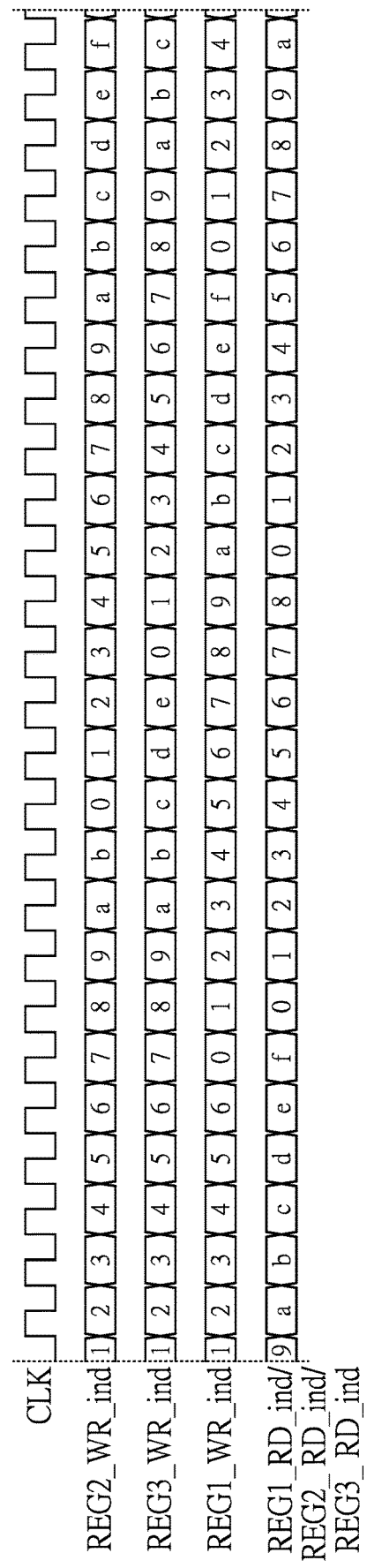
FIG. 5 is a signal timing diagram showing a clock signal, each of input indexes of buffers being reset and each of output indexes of the buffers being set for each transmission path in FIG. 4 according to the second embodiment of the present disclosure.

More specifically, the second embodiment takes the video transmitting circuit 3 in FIG. 3 utilized in a chrominance component interface as an example, but the present disclosure is not limited thereto. Therefore, reference is made to FIG. 4 and FIG. 5, FIG. 4 is a functional block diagram of the video transmitting circuit in FIG. 3 utilized in a chrominance component interface according to the second embodiment of the present disclosure, and FIG. 5 is a signal timing diagram showing a clock signal CLK, each of the input indexes of the buffers being reset and each of the output indexes of the buffers being set for each transmission path in FIG. 4 according to the second embodiment of the present disclosure, in which symbols REG1_WR_ind, REG2_WR_ind and REG3_WR_ind respectively refer to the input indexes of the buffers 331, 341 and 351, symbols REG1_RD_ind, REG2_RD_ind and REG3_RD_ind respectively refer to the output indexes of the buffers 331, 341 and 351. In the second embodiment, the first return signal that is transmitted through the first transmission path 13, the second return signal that is transmitted through the second transmission path 14 and the third return signal that is transmitted through the third transmission path 15 have been sequentially detected by the return detection circuit 11, and the control circuit 32 correspondingly sends out the reset signals to the buffers 331, 341 and 351 when the first, second and third return signals are received, so as to sequentially reset the input indexes of the buffers 331, 341 and 351 to 0. After the input indexes of the buffers 331, 341 and 351 have been reset due to the reset signal, or after the last return signal (e.g., the third return signal in the second embodiment) being received by the video transmitting circuit 1 has been detected by the return detection circuit 11, the control circuit 32 may simultaneously set the output indexes of the buffers 331, 341 and 351 to 0 in order to control each the buffer to output data from their address 0 respectively, such that the component signals that are transmitted through different transmission paths can synchronously arrive at the video receiver 2 when the video transmitting circuit 3 switches from the calibration mode to the normal operating mode. In other words, the second embodiment resets the input indexes of each the buffers, which allows the component signals that are written in each the buffers being timely dislocated, so that the delay skews between each the transmission paths can be compensated.

Moreover, in other embodiments, the control circuit 32 may utilize the reset signal to reset the output index of the buffer. Similarly, address differences between the output indexes that have been reset by the buffers can be utilized to timely dislocate each of the component signals outputted by each of the buffers, so that the delay skews between each the transmission paths can be compensated as well. Since the operations of the buffer are well known in the art, details regarding using the buffer to realize the delay circuit will not be reiterated herein. Accordingly, the embodiments of the present disclosure may utilize the address differences of each the input indexes (or the output indexes) of each the buffers before and after the buffers have been reset to infer the length of each the transmission paths, and utilize the address differences of each the input indexes (or the output indexes) of each the buffers before and after the buffers have been reset to compensate each the delay skews between each the transmission paths, such that component signals can synchronously arrive at the video receiver 2.

Figure 6:
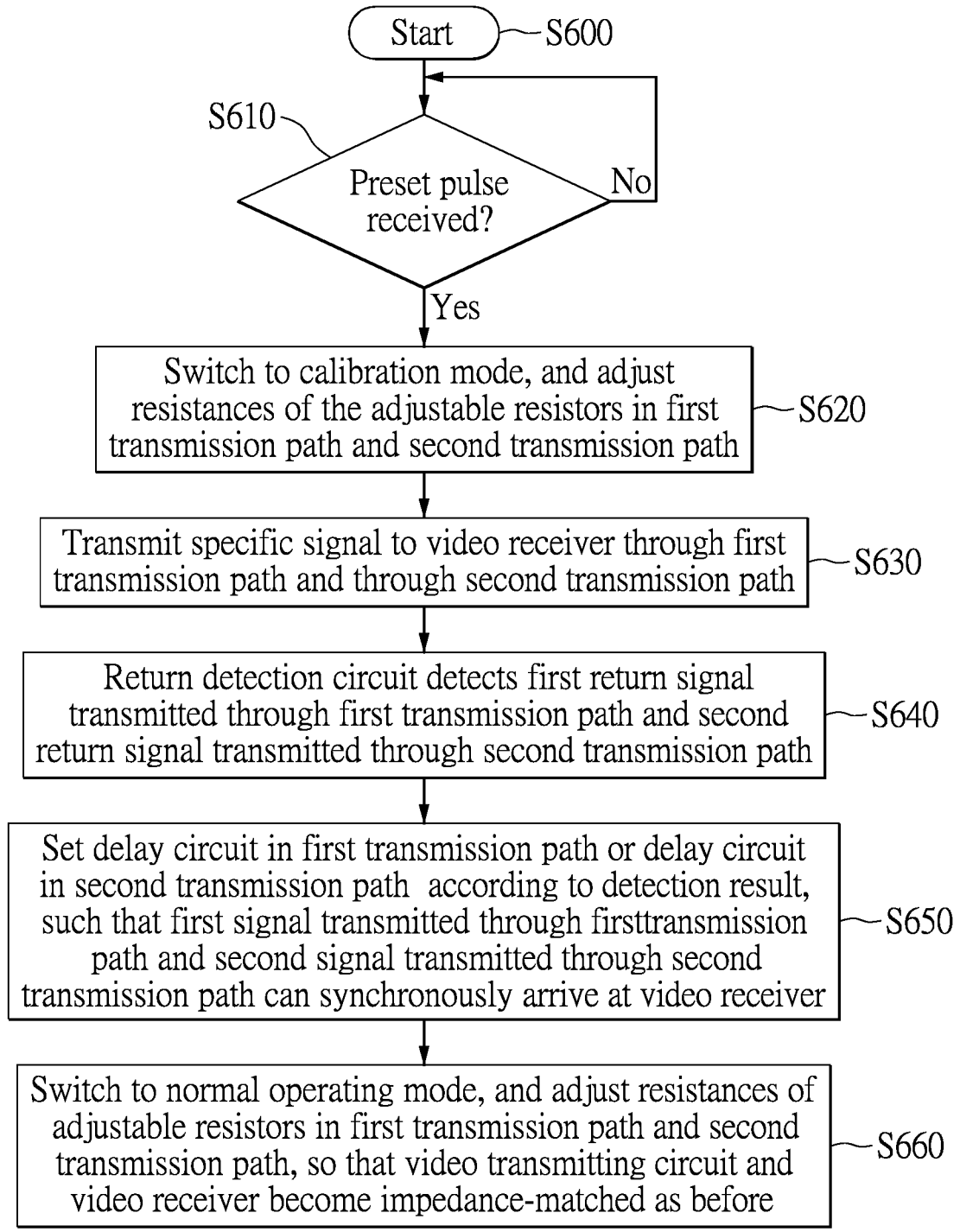
FIG. 6 is a flowchart of a signal delay compensation method according to the first embodiment of the present disclosure.

Finally, in order to explain the operations of the above-mentioned video transmitting circuit, the present disclosure further provides an embodiment of a signal delay compensation method. Referring to FIG. 6, FIG. 6 is a flowchart of the signal delay compensation method according to the first embodiment of the present disclosure. It should be noted that the signal delay compensation method in FIG. 6 can be performed by the video transmitting circuit 1 in FIG. 1 or the video transmitting circuit 3 in FIG. 3, but herein takes the first embodiment in FIG. 1 as an example for understanding. Moreover, detailed operations of the steps in FIG. 6 can be obtained by referring to descriptions regarding the above-mentioned embodiments, and the following only provides a brief description thereof.

As shown in FIG. 6, in the step S610, the pre-processing circuit 10 detects whether or not the video transmitting circuit 1 has received the preset pulse. The video transmitting circuit 1 performs the step S620 until the preset pulse being received by the video transmitting circuit 1 has been detected by the pre-processing circuit 10, in which the video transmitting circuit 1 switches from the normal operating mode to the calibration mode, and adjusts the resistance of the adjustable resistor 132 in the first transmission path 13 and the resistance of the adjustable resistor 142 in the second transmission path 14; for example, adjust the resistances of the adjustable resistors 132 and 142 to 0 ohms. Then, in the step S630, the pre-processing circuit 10 transmits the specific signal to the video receiver through the first transmission path 13 and through the second transmission path 14. In the step S640, in the calibration mode, the return detection circuit 11 detects whether or not the first return signal transmitted through the first transmission path 13 and the second return signal transmitted through the second transmission path 14 from the video receiver 2 have been received by the video transmitting circuit 1.

Moreover, in the step S650, the control circuit 12 sets the delay circuit 131 in the first transmission path 13 or the delay circuit 141 in the second transmission path 14 according to the detection result of the return detection circuit 11, such that a first signal S1 transmitted through the first transmission path 13 and a second signal S2 transmitted through the second transmission path 14 can synchronously arrive at the video receiver 2. However, after the first return signal transmitted through the first transmission path 13 and the second return signal transmitted through the second transmission path 14 from the video receiver 2 being received by the video transmitting circuit 1 has been detected by the return detection circuit 11, the video transmitting circuit 1 switches from the calibration mode to the normal operating mode, and adjusts the resistance of the adjustable resistor 132 in the first transmission path 13 and the resistance of the adjustable resistors 142 in the second transmission path 14, so that the video transmitting circuit 1 and the video receiver 2 become impedance-matched as before, i.e., step S660.

Figure 7:
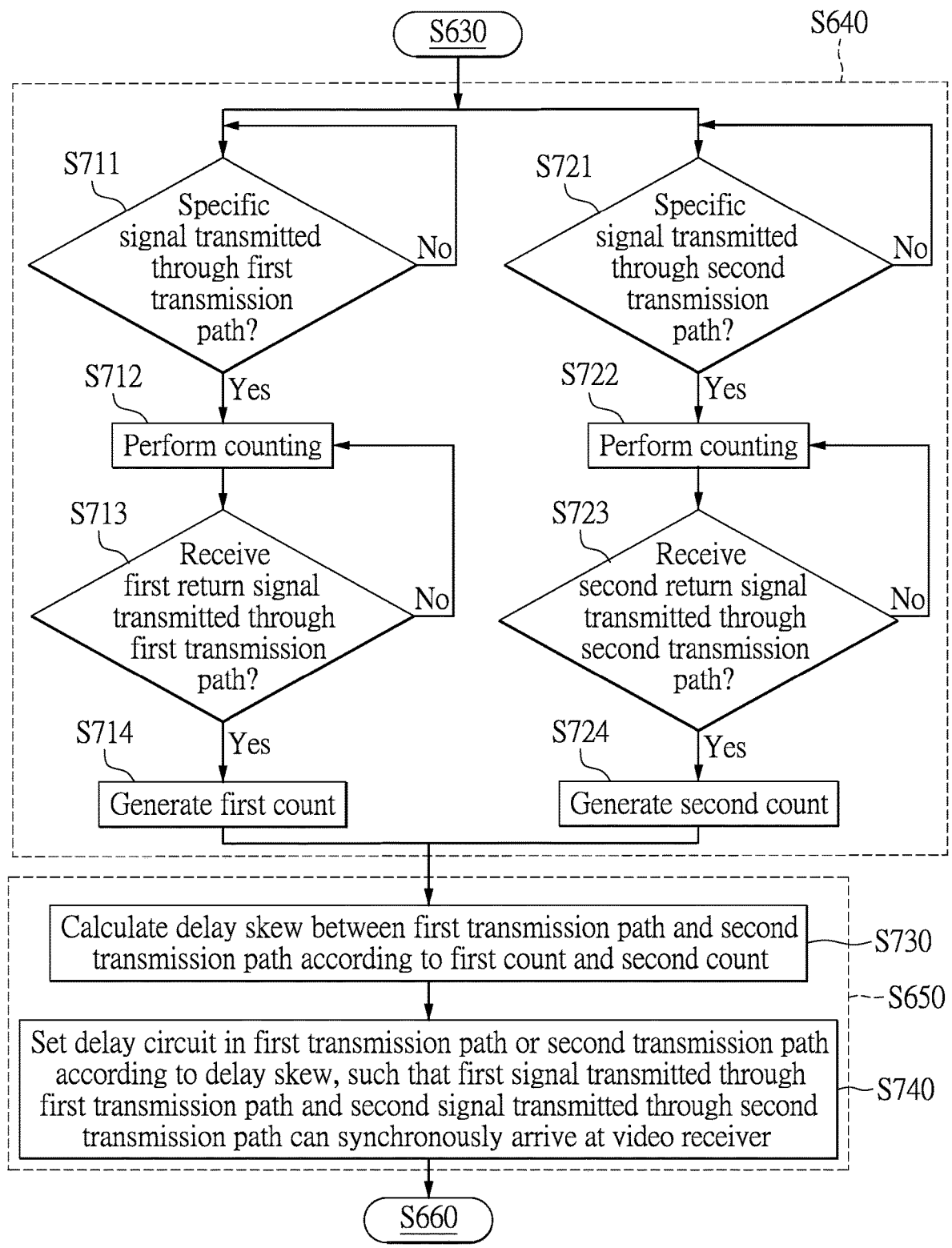
FIG. 7 is a subsequent flowchart of steps S640 and S650 in FIG. 6 according to the first embodiment of the present disclosure.

Furthermore, referring to FIG. 7, FIG. 7 is a subsequent flowchart of the steps S640 and S650 in FIG. 6 according to the first embodiment of the present disclosure. As shown in FIG. 7, the step S640 includes the steps S711 to S714 and the steps S721 to S724, in which the steps S711 to S714 and the steps S721 to S724 can be performed simultaneously. In the step S711, the first signal detection circuit 111 detects whether or not the specific signal is transmitted through the first transmission path 13, and the video transmitting circuit 1 performs the step S712 until the specific signal being transmitted through the first transmission path 13 has been detected by the first signal detection circuit 111. In the step S712, the first signal detection circuit 111 performs counting. In the step S713, the return detection circuit 11 detects whether or not the first return signal transmitted through the first transmission path 13 has been received by the video transmitting circuit 1. If not, the video transmitting circuit 1 returns to perform the step S712, and the first signal detection circuit 111 keeps counting. When the first return signal transmitted through the first transmission path 13 being received by the video transmitting circuit 1 has been detected by the first signal detection circuit 111, the video transmitting circuit 1 performs the step S714, and the first signal detection circuit 111 generates the first count.

On the other hand, in the step S721, the second signal detection circuit 112 detects whether or not the specific signal is transmitted through the second transmission path 14. The video transmitting circuit 1 performs the step S722 until the specific signal being transmitted through the second transmission path 14 has been detected by the second signal detection circuit 112. In the step S722, the second signal detection circuit 112 performs counting. In the step S723, the return detection circuit 11 detects whether or not the second return signal transmitted through the second transmission path 14 has been received by the video transmitting circuit 1. If not, the video transmitting circuit 1 returns to perform the step S722, and the second signal detection circuit 112 keeps counting. When the second return signal transmitted through the second transmission path 14 being received by the video transmitting circuit 1 has been detected by the second signal detection circuit 112, the video transmitting circuit 1 performs the step S724, and the second signal detection circuit 112 generates the second count.

Moreover, the step S650 may include the steps S730 to S740, and in this embodiment, the steps S730 to S740 must be performed after the steps S711 to S714 and steps S721 to S724 are completed. In the step S730, the control circuit 12 calculates the delay skew between the first transmission path 13 and the second transmission path 14 according to the first count and the second count. In the step S740, the control circuit 12 sets the delay circuit 131 in the first transmission path 13 or the delay circuit 141 in the second transmission path 14 according to the delay skew, such that the first signal S1 transmitted through the first transmission path 13 and the second signal S2 transmitted through the second transmission path 14 can synchronously arrive at the video receiver 2. Detailed operations of the steps in FIG. 7 can be obtained by referring to descriptions regarding the abovementioned embodiments, and will not be reiterated herein.

Figure 8:
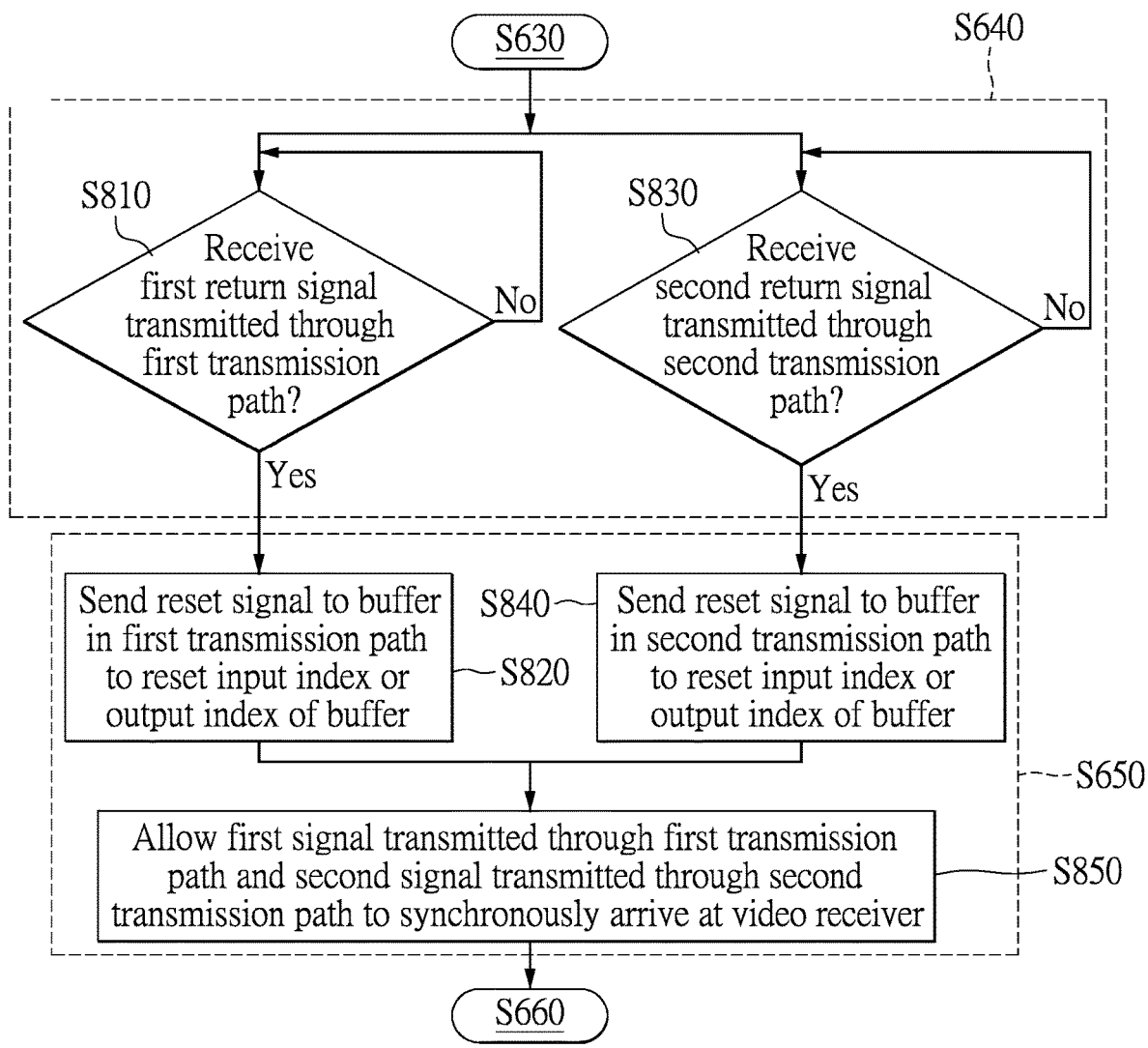
FIG. 8 is a subsequent flowchart of the steps S640 and S650 in FIG. 6 according to the second embodiment of the present disclosure.

The delay circuit may be realized by a buffer, in such a situation, the pre-processing circuit 10 simultaneously transmits the specific signal to the video receiver 2 through the first transmission path 13 and the second transmission path 14. Therefore, reference may instead be made to FIG. 3 for understanding. Further, reference is made to FIG. 8, FIG. 8 is a subsequent flowchart of the steps S640 and S650 in FIG. 6 according to the second embodiment of the present disclosure. As shown in FIG. 8, the steps S640 to S650 include the steps S810 to S820 and the steps S830 to S840, in which the steps S810 to S820 and the steps S830 to S840 can be performed simultaneously. In the step S810, the return detection circuit 11 detects whether or not the first return signal transmitted through the first transmission path 13 has been received by the video transmitting circuit 1. If not, the video transmitting circuit 1 returns to perform the step S810. When the first return signal transmitted through the first transmission path 13 being received by the video transmitting circuit 1 has been detected by the return detection circuit 11, the video transmitting circuit 1 performs the step S820, the control circuit 32 sends the reset signal to the buffer 331 in the first transmission path 13 to reset the input index or the output index of the buffer 331; for example, the input index is reset to 0.

On the other hand, in the step S830, the return detection circuit 11 detects whether or not the second return signal transmitted through the second transmission path 14 has been received by the video transmitting circuit 1. If not, the video transmitting circuit 1 returns to perform the step S830. When the second return signal transmitted through the second transmission path 14 being received by the video transmitting circuit 1 has been detected by the return detection circuit 11, the video transmitting circuit 1 performs the step S840, the control circuit 32 sends the reset signal to the buffer 341 in the second transmission path 14 to reset the input index or the output index of the buffer 341; for example, the input index is reset to 0.

Moreover, the step S650 further includes the step S850, and in this embodiment, the step S850 must be performed after the steps S810 to S820 and the steps S830 to S840 are completed. That is to say, after the input index or the output index of the buffer 331 in the first transmission path 13 is reset by the reset signal and the input index or the output index of the buffer 341 in the second transmission path 14 is reset by the reset signal, the video transmitting circuit 1 performs the step S850, such that the first signal S1 transmitted through the first transmission path 13 and the second signal S2 transmitted through the second transmission path 14 can synchronously arrive at the video receiver 2. Detailed operations of the steps in FIG. 8 can be obtained by referring to descriptions regarding the abovementioned embodiments, and will not be reiterated herein.

To sum up, the embodiments of the present disclosure provide a video transmitting circuit and a signal delay compensation method thereof, in which the transmitter end detects the transmitted signal by analog detection, calculates the delay skew between the transmission paths according to the characteristics of signal reflection due to impedance mismatch, and then sets the delay circuit of at least one transmission path according to the delay skew, such that each the component signals transmitted through each the transmission paths can synchronously arrive at the video receiver. Moreover, the delay circuit may be realized by a buffer, and the input index or the output index of the buffer in the transmission path can be reset by the reset signal when the return signal from the video receiver has been received by the video transmitting circuit, such that the first signal transmitted through the first transmission path and the second signal transmitted through the second transmission path can synchronously arrive at the video receiver.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A video transmitting circuit configured to transmit a video signal at least composed of a first signal and a second signal, in which the first signal is transmitted through a first transmission path and the second signal is transmitted through a second transmission path to a video receiver, and comprising:
a pre-processing circuit configured to detect whether or not a preset pulse has been received by the video transmitting circuit, wherein the video transmitting circuit switches to a calibration mode and the pre-processing circuit transmits a specific signal to the video receiver through the first transmission path and the second transmission path when the preset pulse is received by the video transmitting circuit;
a return detection circuit configured to detect a first return signal transmitted through the first transmission path and a second return signal transmitted through the second transmission path from the video receiver to the video transmitting circuit when the video transmitting circuit is in the calibration mode, wherein the first return signal corresponds to the specific signal transmitted through the first transmission path and the second return signal corresponds to the specific signal transmitted through the second transmission path; and
a control circuit coupled to the return detection circuit, and configured to calculate a delay skew between the first transmission path and the second transmission path according to a detection result of the return detection circuit, and set a first delay circuit serially connected in the first transmission path or a second delay circuit serially connected in the second transmission path in the video transmitting circuit according to the delay skew, such that the first signal transmitted through the first transmission path and the second signal transmitted through the second transmission path can synchronously arrive at the video receiver.

2. The video transmitting circuit of claim 1, wherein a first adjustable resistor is serially connected in the first transmission path and a second adjustable resistor is serially connected in the second transmission path in the video transmitting circuit, the first and second adjustable resistors being located close to the video receiver, and the video transmitting circuit adjusting a first resistance of the first adjustable resistor in the first transmission path and a second resistance of the second adjustable resistor in the second transmission path in the video transmitting circuit when the video transmitting circuit is in the calibration mode due to a reception of the preset pulse, and wherein the video transmitting circuit receives the first return signal and the second return signal due to impedance mismatch from the video receiver after the specific signal has been transmitted.

3. The video transmitting circuit of claim 1, wherein the preset pulse includes at least one blanking section of the video signal or a null signal section that is outside of a visible section of the video signal.

4. The video transmitting circuit of claim 1, wherein the return detection circuit at least includes:
a first signal detection circuit coupled to the first transmission path, configured to start counting when the specific signal being transmitted through the first transmission path has been detected, and generating a first count until the first return signal transmitted through the first transmission path being received by the video transmitting circuit has been detected; and
a second signal detection circuit coupled to the second transmission path, configured to start counting when the specific signal being transmitted through the second transmission path has been detected, and generating a second count until the second return signal transmitted through the second transmission path being received by the video transmitting circuit has been detected;
wherein the control circuit calculates the delay skew between the first transmission path and the second transmission path according to the first count and the second count.

5. A video transmitting circuit configured to transmit a video signal at least composed of a first signal and a second signal, in which the first signal is transmitted through a first transmission path and the second signal is transmitted through a second transmission path to a video receiver, comprising:
a pre-processing circuit configured to detect whether or not the video transmitting circuit has received a preset pulse, wherein the video transmitting circuit switches to a calibration mode and the pre-processing circuit simultaneously transmits a specific signal to the video receiver through the first transmission path and the second transmission path when the preset pulse is received by the video transmitting circuit;
a return detection circuit configured to detect a first return signal transmitted through the first transmission path and a second return signal transmitted through the second transmission path from the video receiver to the video transmitting circuit when the video transmitting circuit is in the calibration mode, wherein the first return signal corresponds to the specific signal transmitted through the first transmission path and the second return signal corresponds to the specific signal transmitted through the second transmission path; and
a control circuit coupled to the return detection circuit, and configured to transmit a reset signal for resetting an input index or an output index of the first buffer and an input index or an output index of the second buffer to a first buffer serially connected in the first transmission path or a second buffer serially connected in the second transmission path in the video transmitting circuit when the first return signal transmitted through the first transmission path or the second return signal transmitted through the second transmission path being received by the video transmitting circuit has been detected by the return detection circuit.

6. The video transmitting circuit of claim 5, wherein a first adjustable resistor is serially connected in the first transmission path and a second adjustable resistor is serially connected in the second transmission path in the video transmitting circuit, the first and second adjustable resistors being located close to the video receiver, and the video transmitting circuit adjusting a first resistance of the first adjustable resistor in the first transmission path and a second resistance of the second adjustable resistor in the second transmission path in the video transmitting circuit when the video transmitting circuit is in the calibration mode due to a reception of the preset pulse, and wherein the video transmitting circuit receives the first return signal and the second return signal due to impedance mismatch from the video receiver after the specific signal has been transmitted.

7. The video transmitting circuit of claim 5, wherein after the input indexes of the first buffer serially connected in the first transmission path and the second buffer serially connected in the second transmission path have been reset by the reset signal, the control circuit synchronously sets the output indexes of the first and second buffers, such that the first signal transmitted through the first transmission path and the second signal transmitted through the second transmission path can synchronously arrive at the video receiver.

8. A signal delay compensation method used in a video transmitting circuit configured to transmit a video signal at least composed of a first signal and a second signal, and transmit the first signal through a first transmission path and the second signal through a second transmission path to a video receiver, and comprising:

detecting, by a pre-processing circuit, whether or not a preset pulse has been received by the video transmitting circuit, wherein when the preset pulse has been received by the video transmitting circuit, switching, by the video transmitting circuit, to a calibration mode, and wherein a specific signal is transmitted, by the pre-processing circuit, to the video receiver through the first transmission path and the second transmission path;

detecting, by a return detection circuit, whether or not a first return signal transmitted through the first transmission path and a second return signal transmitted through the second transmission path from the video receiver have been received by the video transmitting circuit when the video transmitting circuit is in the calibration mode, wherein the first return signal corresponds to the specific signal transmitted through the first transmission path and the second return signal corresponds to the specific signal transmitted through the second transmission path; and setting, by a control circuit, a first delay circuit serially connected in the first transmission path or a second delay circuit serially connected in the second transmission path in the video transmitting circuit according to a detection result of the return detection circuit, such that the first signal and the second signal can synchronously arrive at the video receiver through the first transmission path and the second transmission path, respectively.

9. The method according to claim 8, wherein a first adjustable resistor is serially connected in the first transmission path and a second adjustable resistor is serially connected in the second transmission path in the video transmitting circuit, the first and second adjustable resistors being located close to the video receiver, and wherein, when the video transmitting circuit switches to the calibration mode due to a reception of the preset pulse, the method further comprises:

adjusting, by the video transmitting circuit, a first resistance of the first adjustable resistor in the first transmission path and a second resistance of the second adjustable resistor in the second transmission path in the video transmitting circuit, and the video transmitting circuit receiving the first return signal and the second return signal due to impedance mismatch from the video receiver after the specific signal has been transmitted.

10. The method according to claim 9, wherein after the first return signal transmitted through the first transmission path and the second return signal transmitted through the second transmission path being received by the video transmitting circuit has been detected by the return detection circuit, the method further comprises:

switching, by the video transmitting circuit, from the calibration mode to a normal operating mode; and adjusting, by the video transmitting circuit, the first resistance of the first adjustable resistor serially connected in the first transmission path and the second resistance of the second adjustable resistor serially connected in the second transmission path in the video transmitting circuit, such that the video transmitting circuit and the video receiver becomes impedance-matched.

11. The method according to claim 8, wherein the preset pulse includes at least one blanking section of the video signal or a null signal section that is outside of a visible section of the video signal.

12. The method according to claim 8, wherein the step of detecting, by the return detection circuit, whether or not the first return signal transmitted through the first transmission path and the second return signal transmitted through the second transmission path from the video receiver have been received by the video transmitting circuit at least includes:

starting counting, by a first signal detection circuit, when the specific signal being transmitted through the first transmission path has been detected; and generating, by the first signal detection circuit, a first count until the first return signal being transmitted through the first transmission path has been detected by the video transmitting circuit; and starting counting, by a second signal detection circuit, when the specific signal being transmitted through the second transmission path has been detected; and generating, by the second signal detection circuit, a second count until the second return signal being transmitted through the second transmission path has been detected by the video transmitting circuit.

13. The method according to claim 12, wherein the step of setting, by the control circuit, the delay circuit according to the detection result of the return detection circuit includes:

calculating, by the control circuit, a delay skew between the first transmission path and the second transmission path according to the first count and the second count; and setting, by the control circuit, the first delay circuit serially connected in the first transmission path or the second delay circuit serially connected in the second transmission path according to the delay skew.

14. The method according to claim 8, wherein, when the delay circuit is a buffer, the pre-processing circuit simultaneously transmits the specific signal to the video receiver through the first transmission path and the second transmission path, and the step of setting, by the control circuit, the first delay circuit serially connected in the first transmission path or the second delay circuit serially connected in the second transmission path in the video transmitting circuit according to the detection result of the return detection circuit includes:

transmitting, by the control circuit, a reset signal to a first buffer serially connected in the first transmission path or a second buffer serially connected in the second transmission path to reset input indexes or output indexes of the first and second buffers when the first return signal transmitted through the first transmission path or the second return signal transmitted through the second transmission path being received by the video transmitting circuit has been detected by the return detection circuit.

\* \* \* \* \*